US007926725B2

(12) United States Patent
Charlier et al.

(10) Patent No.: US 7,926,725 B2
(45) Date of Patent: Apr. 19, 2011

(54) METHOD OF MAKING A TOKEN WITH AN ELECTRONIC IDENTIFIER

(75) Inventors: Gerard Charlier, Beaune (FR); Heriberto Corrales Castañeda, Col. Residencias (MX)

(73) Assignee: Gaming Partners International USA, Inc., Las Vegas, NV (US)

( * ) Notice: Subject to any disclaimer, the term of this patent is extended or adjusted under 35 U.S.C. 154(b) by 1214 days.

(21) Appl. No.: 11/269,758

(22) Filed: Nov. 9, 2005

(65) Prior Publication Data

US 2006/0273181 A1 Dec. 7, 2006

Related U.S. Application Data

(60) Provisional application No. 60/686,419, filed on Jun. 2, 2005.

(51) Int. Cl.
*G06K 19/06* (2006.01)
(52) U.S. Cl. ......................................... 235/492; 235/487
(58) Field of Classification Search .................. 235/492, 235/487, 451, 493
See application file for complete search history.

(56) References Cited

U.S. PATENT DOCUMENTS

| | | | | |
|---|---|---|---|---|
| 2,836,911 A | * | 6/1958 | Priesmeyer | 40/27.5 |
| 3,439,439 A | * | 4/1969 | Stimson | 40/1.5 |
| 3,670,524 A | * | 6/1972 | Korwin | 63/18 |
| 3,926,291 A | * | 12/1975 | Burke et al. | 194/213 |
| 4,818,855 A | * | 4/1989 | Mongeon et al. | 235/440 |
| 6,021,949 A | * | 2/2000 | Boiron | 235/492 |
| 6,581,747 B1 | | 6/2003 | Charlier et al. | |
| 2002/0006829 A1 | | 1/2002 | Purton | |

OTHER PUBLICATIONS

U.S. Appl. No. 11/269,757, filed Nov. 9, 2005.
U.S. Appl. No. 11/269,759, filed Nov. 9, 2005.

* cited by examiner

*Primary Examiner* — Daniel St Cyr
(74) *Attorney, Agent, or Firm* — Brownstein Hyatt Farber Schreck, LLP

(57) ABSTRACT

A method of making a token, wherein the token includes a flat body made of a plastic material. The flat body has at least two parallel faces and a cavity which opens to at least one of the at least two parallel faces. The cavity receives an electronic identification device. At least one plug made of a plastic material is included. The plug is inserted into the cavity to retain the electronic device. The electronic device is in the form a pellet having outer film layers enveloping the electronic elements. The film layers are perforated. The method includes making the flat body, forming the cavity in the flat body, placing the electronic identification device in the cavity, inserting the at least one plug in the cavity, and fixing the at least one plug to the flat body using compression and heat so that the plastic material of the plug flows through the pellet.

15 Claims, 3 Drawing Sheets

METHOD OF MAKING A TOKEN WITH AN ELECTRONIC IDENTIFIER

CROSS-REFERENCE TO RELATED APPLICATIONS

The present application claims priority under 35 U.S.C. 119(e) of U.S. Provisional Patent Application No. 60/686,419, filed on Jun. 2, 2005, the disclosure of which is expressly incorporated by reference herein in its entirety.

Additionally, the present application discloses subject matter similar to that disclosed in copending application Ser. No. 11/269,757, entitled "Token with an Electronic Identifier," filed on Nov. 9, 2005.

BACKGROUND OF THE INVENTION

1. Field of the Invention

This invention generally concerns gaming tokens such as disks, or flat plaques, or cards, integrating an electronic chip or an electronic identifier (called hereafter electronic identification device). The applications for the present invention are to be found, amongst others, in the contactless identification of persons and objects also called electronic labeling, and in the authentication, the identification and management (in particular the tracking and counting) of gaming tokens, also called casino chips. The expression "gaming token" covers any token that can be used in a gaming room and representing a value that is predetermined or not. Gaming tokens are usually made of a rigid plastic material to obtain a structure that is solid enough to resist conditions of use in casinos which are often very tough. The term "token" is used in this application to refer to any flat body that may include an electronic circuit.

2. Discussion of Background Information

U.S. Pat. No. 6,021,949, commonly owned with the present application, describes a gaming token or plaque, the body of which integrates an electronic chip and is made from laminated sheets of rolled plastic material. The electronic chip or electronic identifier includes an electronic circuit with a memory bearing identification and/or coding information concerning the person or object associated with the token (electronic label) or the token itself (gaming token or payment token), the electronic circuit generally being associated with an emitter-receiver connected to an antenna and adapted to be supplied by inductive coupling. The electronic chip is placed in the center of an opening provided in the body of the plaque, protected and held on either side by two rigid wafers and finally joined together and integrated into the body of the plaque by a lamination of top sheets of transparent cellulose acetate followed by the thermoforming of the assembly.

The manufacturing process for the body of the plaque incorporating the electronic chip by laminating thin sheets of plastic material described in the above mentioned patent was well adapted to highly decorated plaques and those representing a high nominal value, usually manufactured in small or medium sized series. However, a good protection of the electronic chip when it is integrated into the body of the plaque required a certain thickness (usually between 4 and 6 mm) so gaming tokens or plaques with a thickness of about 3 mm and equipped with an electronic chip were difficult to manufacture using this method with an excessive number of rejects resulting from the destruction of the chip.

To facilitate the manufacture of thinner game tokens, commonly assigned U.S. Pat. No. 6,581,747, the entire disclosure of which is hereby expressly incorporated by reference, discloses a gaming token or plaque or similar device made of plastic with a cavity in which an electronic identification device is placed. The electronic device includes an emitter-receiver and a peripheral antenna placed between two thin plastic films joined along their peripheries to form a protective envelope or pellet. The cavity offers at least one face opening closed by a plastic plug inserted into the cavity and assembled directly with the flat body, retaining the electronic device therein.

This structural arrangement made the token very robust while reducing its thickness by eliminating any superfluous layer of plastic. Furthermore, the simplification of their structure made the tokens much easier to manufacture. Plugs were inserted with a minimum clearance in the face openings of the cavities having matching shapes and directly assembled with the body of the token or plaque. The plug, inserted into the cavity in a solid state, possibly softened or pasty was deformed and welded to the body of the token by combined heating and pressure. Thus, the deformation capacity of the plug ensured a very robust weld, and a good cohesion between the token body and the thus completed electronic identifier.

However, the electronic device utilized in the above mentioned prior art, was of a relatively small physical size, incorporating components capable of operating with a relatively low frequency. To accommodate higher frequencies a larger size, typically a larger diameter, electronic pellet was necessary. The increased size was found to be accompanied by an increased incidence of breakage of the pellet envelope. Because the electronic pellet was heterogonous rather than homogeneous, stresses from the deforming plastic plug were concentrated at certain points of the envelope, causing the plastic film to break. Also, there was no direct interconnection between the upper and lower surfaces of the token, weakening the structure. Thus, the manufacturing process was accompanied by a high number of rejected defective tokens.

SUMMARY OF THE INVENTION

According to the present invention, there is a reduction in the incidence of breakage of the electronic identification envelope and a strengthening of the token body. Thus, particularly where larger electronic identification pellets are used, a more robust chip with a lesser number of manufacturing rejects is obtained.

For this purpose the electronic identification pellet is made by forming the envelope around the electronic components from a film which includes at least one opening or perforation. The perforation facilitates the flow of the deforming plastic plug to interconnect the token parts and reduce the stress concentrations on the envelope.

The perforations may be in the form of one or more holes punched in a sheet of plastic, which is later cut to yield the appropriate size film for the envelope. The perforations themselves may be of various shapes and sizes, including round, rectangular, or elliptical, and extend completely through the film. Where the envelope for the electronic identification device is formed by an upper and a lower film, each film may include perforations which would enable the flowing plastic of the plug to extend through the pellet and interconnect the upper and lower surfaces of the token.

The particular design of the perforation, its size, shape and number, is determined so as to maximize the contact surface between the top and bottom of the token body while leaving enough plastic film to cover the circuitry of the electronic identifier within the pellet. With heating and pressure application, the plastic of the plug passes through the pellet and joins the upper and lower surfaces of the body with continuous, homogeneous plastic material, solidifying the token and preventing separation of its components.

Preferably, the electronic identification device includes an electronic circuit having a memory containing information concerning the token, for example an identification code and an emitter-receiver with a peripheral antenna adapted to be supplied by inductive coupling, the whole assembly being placed in a protective enclosure such as a thin film flat envelope, followed by a protective shell made of rigid plastic or a hardened coating resin pellet, especially of the epoxy type. The token body includes either a through hole or a cavity that provides a housing. Preferably, the electronic identification device and the protective enclosure are in the form of a flat disk with a smaller diameter than the diameter of the housing hole or cavity in which it is received.

In one embodiment of the invention, the token includes a cavity extending from one surface into, but not through, the body. The pellet is placed on the stepped bottom of the cavity and overlaid with a plug, in this case acting as a lid. Completing the assembly, decals or labels containing indicia, are placed over the lid and beneath the token body. All the components of the token are then fused or welded together in a single thermo-compression process.

Where a component of the electronic circuit within the pellet envelope might have greater thickness, the bottom of the cavity or housing can include a recess to accommodate this component without damage during the thermo-compression process.

The body and the plug are made of an identical or different thermoplastic material, showing a vitreous transition temperature of between 40 degrees C. and 130 degrees C., preferably between 50 degrees C. and 100 degrees C.

Various embodiments of the invention use bodies and plugs of thermoplastic material. The bodies and plugs are each made of a thermoplastic material belonging to one of the following families:

the styrenes and their copolymers, in particular PBS and ABS, the methacrylics, in particular PMMA, the vinyls in particular PVC and their copolymers, the celluloses, in particular cellulose acetate, the saturated polyesters, in particular PBT and the polyolefins, in particular PE hd and their copolymers.

According to yet another embodiment of the invention, the body and the plug are made of identical or different thermosetting plastic, namely a material belonging to the family of non-saturated polyesters.

As an alternative, the body and the plug for the two embodiments of the invention presented above are made of plastic materials having the same basic polymer so as to facilitate the welding between the body and the plug, or of plastic material compatible with welding.

According to the invention, a method for manufacturing an electronic identifier including an electronic circuit, an emitter-receiver, and a peripheral antenna to form an electronic identification device comprises:

preparing an upper and a lower layer of film by punching a sheet of plastic to form perforations, cutting the sheet to form appropriately sized film layers, placing the electronic components between the perforated film layers, and joining the film layers around their peripheries to form an envelope surrounding the electronic identifier, thereby forming an electronic pellet for inclusion in a game or token body.

The invention also concerns a method of manufacturing a gaming token or plaque or similar device, hereinafter called token, with a thermoplastic body, including the following:

manufacturing by groups or by unit, the thermoplastic token body, making a cavity in the body having at least one face opening, placing in the cavity the electronic identification device and inserting a plug or lid in each face opening, closing of the cavity by welding of the plug(s) with the token body previously heated, in particular and around the area of each opening by applying pressure to the heated area(s), cutting of the contour of the token body and/or finishing of the edge of the token, if necessary.

The invention also concerns a method of manufacturing a gaming token or plaque or similar device, hereinafter called token, with a thermosetting body, including the following operations:

manufacturing a preform of the token body in a thermosetting plastic material, making cavity in the preform having at least one face opening, placing the electronic identification device in the cavity and inserting plug in each face opening, placing the whole preform of the token body equipped with the electronic identification device and plug(s) into a mold, making the token body by thermocompression of the preform and closing of the cavity in the token body.

In either of the methods above, decals or labels having indicia can be placed on both faces of the token body.

It should also be noted that the invention is not limited to gaming tokens and plaques, but also concerns similar devices equipped with an electronic chip and having similar shapes and structures, in particular fixed amount prepaid tokens and electronic payment tokens, electronic labels, plaques or electronic identification cards and it should also be noted that electronic identification may sometimes be limited to a simple authentication of the electronic chip, i.e. the recognition of the presence of the chip by an associated contactless reader (radio-frequency reader also called RFID reader) for electronic transaction (read and/or write).

Other objects, characteristics and advantages of the present invention will be apparent on reading the following description of various embodiments of the invention, including methods of manufacturing thereof, which are given as non-restricting examples in reference to the attached drawings.

BRIEF DESCRIPTION OF THE DRAWINGS

It should be noted that the plaques and tokens illustrated in the drawings presented below are shown to a scale that is larger in thickness to facilitate an understanding of the drawings. The present invention is further described in the detailed description which follows, in reference to the noted plurality of drawings by way of non-limiting examples of embodiments of the present invention, in which like reference numerals represent similar parts throughout the several views of the drawings, and wherein.

DETAILED DESCRIPTION OF THE PRESENT INVENTION

Figure 1:
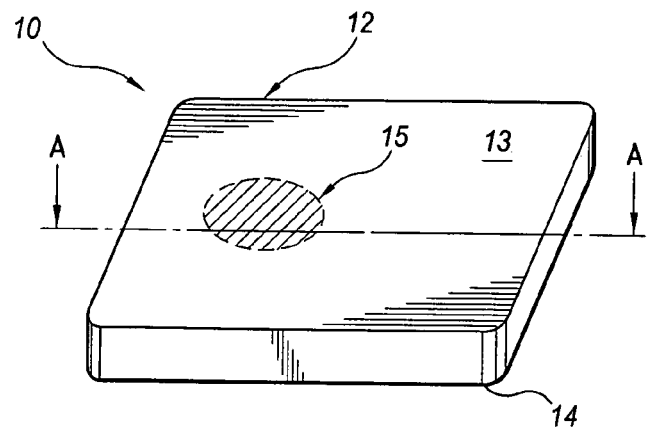
FIG. 1 shows a perspective view of a gaming token made of thermoplastic material with a through cavity in accordance with a first embodiment of the invention.

FIG. 1 shows a first embodiment of the token or plaque in accordance with the invention with a deformable plug and according to which the body of the token or plaque is composed of a thermoplastic material, in the present case a gaming token 10 approximately rectangular, shown in perspective, the flat body 12 of which shows two approximately parallel faces 13 and 14. The token integrates a chip or electronic identifier 16 placed in a cavity 15 crossing through the body 12 perpendicular to the faces 13 and 14. Of course the description of this embodiment of the invention also applies to disk shaped tokens with a circular contour and to flat tokens or cards with various contours, including elliptical contours.

Figure 2:
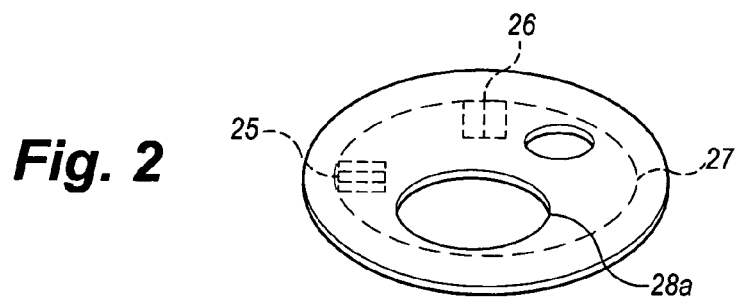
FIG. 2 is a perspective view of an electronic identifier device in accordance with the invention.
Figure 3:
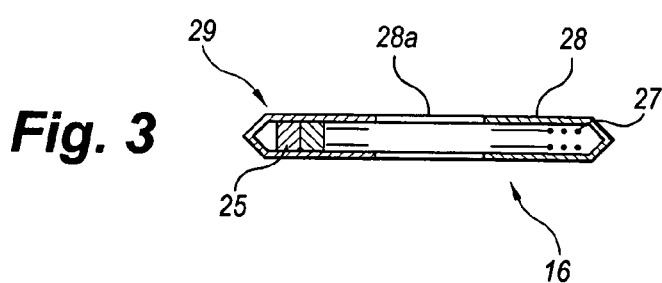
FIG. 3 shows a diametral sectional view of the electronic identification device to be integrated into the token with the dimensions exaggerated for better illustration.

Generally, the electronic identification device 16 shown in FIGS. 2 and 3 includes an electronic circuit 25 with a PROM memory containing information on the token and or the person or object associated with the token, for example a fixed digital or alphanumerical identification code of 64 bytes (including one or several fields such as: the serial number, the identification of a product, batch or place, a digital value associated with the token, etc.), and an emitter-receiver 26 with a peripheral circular antenna 27 adapted to be fed by inductive coupling from the modulated waves of the reader station (not shown). The emitter-receiver is capable of exchanging data without contact by modulated waves with a remote reader station (for example, between 15 cm and 2 m), the working frequency being between 10 kHz and 20 MHz. The electronic device containing a memory, for example, can be used as protection against theft and/or to facilitate the management and inventory of a batch of objects in a defined space (storage areas, warehouses, stores). Of course, without going beyond the scope of the invention, the electronic device 16 equipped with a memory of a non-reprogramable type (read-only) can be replaced by a changing code reprogramable device with possibility of reading and writing to the memory.

The electronic identification device 16 including the emitter-receiver 26 and the peripheral antenna 27 is placed between two thin plastic films 28 welded on the periphery to form a protective envelope, the whole sub-assembly being in the form of a thin pellet 29 of a maximum thickness of around one millimeter and a diameter of between 10 mm and 20 mm. As a result, the cavity 15 has a cylindrical shape with a diameter slightly greater by a few millimeters thus avoiding a premature deterioration of the electronic chip when the electronic identifier is placed in the cavity. Furthermore, without going beyond the scope of the invention, cavities with various sections (e.g., rectangular) are used to house electronic identifiers the antennas of which have matching contours (e.g., rectangular).

As shown in FIG. 3, the film 28 is perforated by having holes 28a placed within its periphery to pass the plastic flow material of the plug as it is compressed during assembly. The holes 28a may be circular or of other shapes including elliptical or rectangular, and may be punched, pierced, or otherwise provided in the film. The shape of the hole may also conform substantially to the shape and placement of the electrical circuit and its components, to the extent that the plastic film is open and not continuous across its surface, yet does not expose the circuitry or the electronic components themselves.

The body 12 of the plaque can be formed in various ways. For example, with injection molding, the cavity, whether crossing through the body or not, is obtained directly during molding, individually, or in a group from thick sheets or strips (monobloc or welded, glued or laminated multiple layers) of predimensioned thermoplastic material having the final thickness of the plaque or token, for example 3 mm.

Figure 4:
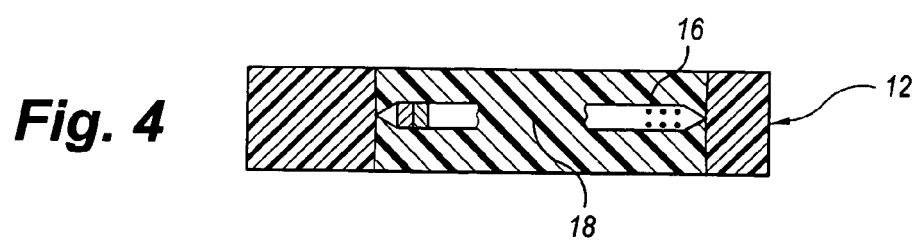
FIG. 4 is a cross sectional view of the electronic identification pellet incorporated in the plastic token.

According to a first variant of the invention, with a through cavity, as illustrated in FIG. 4, the thick sheet or strip is pierced with a number of holes corresponding to the number of plaques or tokens to be produced, the degrouping of the plaques or tokens obtained by cutting and punching or by milling the contour of the plaque or token (also called trimming) being carried out at the end of manufacture after integration of the electronic identifier 16 and closing of the cavity.

According to another variant of the invention, the thick sheet or strip is softened by heating (between 50 degrees C. and 150 degrees C.) and punched to obtain individually the body 12, 12' of the token or plaque. Simultaneously, the cavity intended to be used as a housing recess for the electronic identifier is attained:

either as a through hole 15 (FIG. 5) by punching or cutting out, or as a blind hole, non-through cavity 15' (FIG. 6) with a flat bottom 24' or a stepped bottom, either by die stamping on a part that is still hot or by non-opening spot facing with a milling cutter on a harder cooled part. For example, the cavity has a depth of approximately 2 mm.

The plugs 19, 20, 19' are obtained for example by punching (cold or hot if necessary) from plates or strips with a thickness of between 1 mm and 1.5 mm. The plugs 19 and 20 are inserted (with the electronic identifier 16') in the cavity 15 preferably with a minimum clearance in solid state, sometimes softened or pasty, and deformable during the later stage of compression or welding. The plugs 19 and 20 have a contour that matches that of the cavity 15, e.g. a circular contour, and have a thickness that makes their two external faces slightly overlap the faces 13 and 14 of the body 12 so as to ensure the complete filling of the cavity 15 and a solid weld with mechanical interlocking more or less undulated 25 (see FIG. 4), in the side wall 23 of the cavity when the face openings 17 and 18 are closed.

The body 12 and the plugs 19 and 20 may be made of the same thermoplastic material, in this case loaded between 50% and 70% with barite or barium sulphate, chosen from among one of the following polymer families:

the styrenes and their copolymers, namely polybutadienestyrene (PBS) and acrylonitrile-butadiene styrene (ABS), the methacrylics, namely polymethylmethacrylate (PMMA), the vinyls, namely polyvinyl chloride (PVC) and their copolymers, the celluloses, namely cellulose acetate, the saturated polyesters, namely polybutyleneterphtalate (PBT), and the polyolefines, namely high density polyethylene (PE hd) and their copolymers.

Still within the scope of the present invention, it should be noted that good weld joints can also be obtained by using for the body and plugs, couples of different polymer based thermoplastic materials offering a good compatibility to be welded together, for example the couples ABS/PMMA, ABS/PBT and PVC/PBT. In any case, the undulated mechanical interlocking at joint level reinforces the weld.

The integration of the electronic identifier ends with the heating and compression (respectively shown in FIG. 5 by the straight arrows P and the curved arrows C) of the plugs 19 and 20 and the body 12 using a press, the hot plates 21 and 22 of which are arranged opposite each plug 19 and 20 on either side of the body of the plaque 12. These hot plates 21 and 22 which cover the whole surface of the faces 13 and 14 of the body of the plaque or token are mobile by bringing one close to the other by any known arrangement (not described) so as to push sufficiently, but not in excess, the plugs 19 and 20 towards the inside of the cavity 15 so as to embed the thin pellet or protective envelope 29 of the identifier 16 and to hold the latter in position. On compression, the plastic material of the plugs enters the perforations 28a to extend into the envelope of the pellet. The through flowing plastic 18, in the embodiment of FIG. 5, relieves the stress and forces on the outside of the envelope which might otherwise occur. Additionally, the flowing plastic extends between and interconnects the upper and lower faces of the token while fixing the electronic identifier in place.

The controlled movement of the press with plates 21 and 22 enables the body of the plaque or token to be obtained directly at the required final thickness (for example 3 mm), the body in addition undergoing a slight optional reduction of its thickness (for example, approximately one millimeter).

In special situations, and in particular depending on the types of thermoplastic materials used for the bodies and plugs, the heating temperature is generally between 100 degrees C. and 160 degrees C., and the pressure applied generally between 1 and 10 Mpa (10 to 100 bars). Furthermore, it may be preferable to start heating the body and/or plug before applying the pressure on the plugs and/or body.

Figure 5:
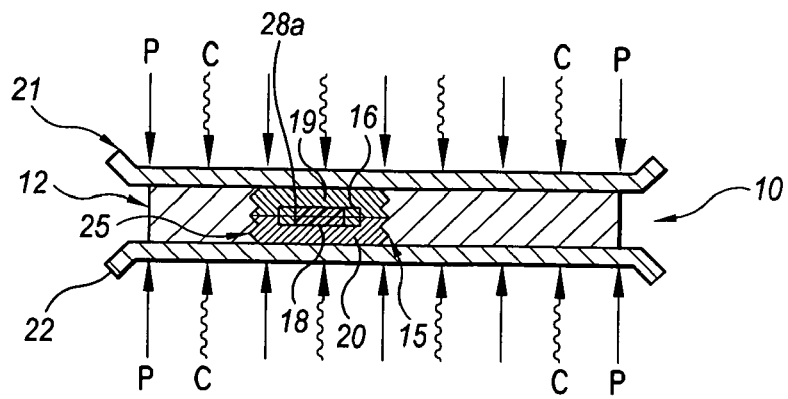
FIG. 5 shows a longitudinal sectional view in a plane perpendicular to the token and passing through the line AA, of FIG. 1 after fixation of the plugs.

As shown in FIG. 5, the plugs 19 and 20, under the combined action of the heat and the pressure applied to each face 13 and 14, are deformed to become welded to the side wall 23 of the cavity 15 and most often form fitting and interlocking undulations 15 when the face openings 17 and 18 are closed, the limit of the welding area disappearing (at least on the surface), when using identical or almost identical thermoplastic material of the same color for the plugs 19 and 20 and the body of the plaque 12. Thus, the creation of a real mechanical interlocking between the plug and the side of the cavity reinforces the weld joint. This interlocking is obtained more easily when heat and pressure are applied on the entire token face (the plastic flow being facilitated) rather than within an area limited to the plug and immediate surroundings of the face openings for the body.

The manufacture of the plaque (or token) continues with the cutting of the contour of the body in the event of group production from a thick sheet and/or the finishing of the edge, if necessary. As an option, it is possible to create a sunk decoration or a new hollow cavity (1 mm to 2 mm) by die punching and/or the placing of a surface decoration on the faces of the plaque (or token), for example by pad printing, hot punching or screen printing and heat bonding covering labels on the faces of the plaque (or token), etc.

Figure 6:
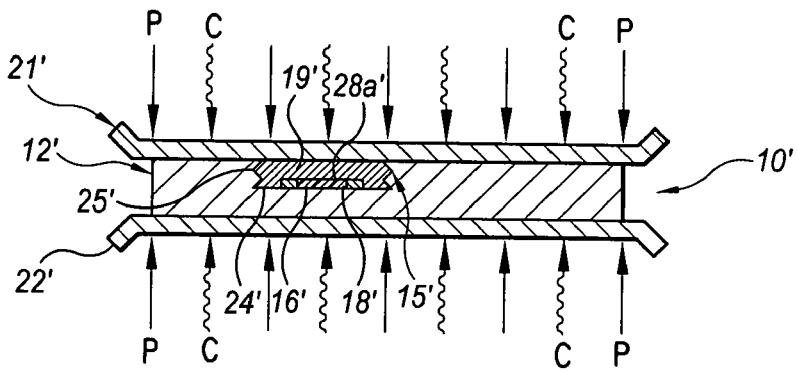
FIG. 6 shows a longitudinal sectional view similar to FIG. 5 of a variant of the token of FIG. 1 with a non-through cavity after fixation of the plug.

FIG. 6 concerns a plaque 10' variant of the plaque 10 (or token) described above and is distinguished from the latter by a non-through cavity 15'. Of generally similar structure, plaques 10 and 10' have a large number of identical or similar technical characteristics, the description of which will not be repeated in detail and which have the same numerical references accompanied by the prime sign.

As shown in FIG. 6, the cavity 15' of the plaque 10' has a flat bottom 24' approximately parallel to the faces 13' and 14' and distant from the sole face opening 17' so as to place the electronic identifier 16' in median position in the thickness of the body 12' with its circular peripheral antenna in parallel position with the faces 13' and 14' of the plaque 10'. As with the plaque 10, a solid but deformable thermoplastic plug 19' is initially inserted into the face opening 17' after placing the identifier 16' in the cavity 15' then welded with undulated mechanical interlocking 25' to the side wall 23' of the cavity 15' by heating and compression. Here again, the plug 19' extends slightly beyond the face 13' and has a sufficient volume to fill the cavity, extending around the periphery of the electronic identifier. As in FIG. 5, the material of the plug extends into the opening 28a' in the upper film and through the envelope of the identifier. Optionally, and additionally, as shown in FIG. 6, the lower film of the envelope includes perforations as well, to enable the flowing plastic 18' to extend completely through the envelope and join all the components of the token. It should be noted that it may be practical to heat the bottom 24' of the cavity 15' through the bottom heating plate 22' to ensure a good support between the electronic identifier 16' and the wall of the bottom 24'. In some cases, a spot of glue can be placed between the bottom 24' and the identifier 16'.

The invention is not limited to the ways, of heating and compression or thermocompression described herein, but concerns the use of technically equivalent ways known to specialists. In particular, the expression "heating" is used in a wide sense and covers especially heating by electrical resistances, high frequency, micro-wave or infrared heating. Within the scope of the invention it is also possible to physically separate the ways of heating from the ways of compression (plate press). Finally, in certain variants of the invention, the plug(s) are preheated before being inserted into the cavity. It is also possible to preheat or to heat during final compression the whole body of the token or plaque. In the same way, the pressing ways can be limited in surface for the thermoplastic material or cover the whole face of the token or plaque for both the thermoplastic material and thermosetting material (as described below), thus allowing a token or a plaque to be obtained with a good surface condition and a high quality visual appearance.

Figure 7:
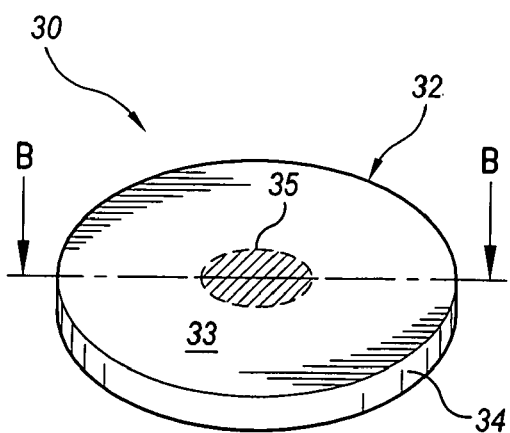
FIG. 7 shows a perspective view of a variant of a token body which is circularly shaped.
Figure 8:
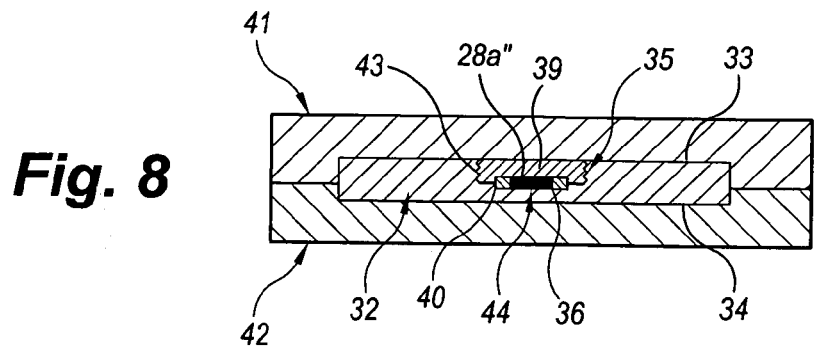
FIG. 8 shows a diametral sectional view, in a plane perpendicular to the token and passing through line BB of the token of FIG. 7 after the thermocompression operation.

FIGS. 7 and 8 concern another embodiment of the token or plaque according to the invention and according to which the body of the token or plaque is made of a thermosetting plastic material, in this case a gaming token 30, the flat body 32 of which has two approximately parallel faces 33 and 34. Generally, the structure of the token 30 is similar to that of the plaque 10' and its description will not be repeated in detail, especially for the same elements.

The token 30 integrates an electronic identifier 36, identical to the electronic identifier 16 described above, placed in a cavity 35 made in the body 32, the antenna of the identifier 36 being placed approximately parallel to faces 33 and 34. The body 32 is realized from a preform made of thermosetting material including a non-through cavity 35 entering into the body 32 at right angles to faces 33 and 34 visible in FIG. 8. The cavity 35 is obtained either directly when the preform is realized (cold pre-molding), or by removing material. As an alternative, the bottom 40 of the cavity has a central step to determine a housing recess 44 for the electronic identifier 36.

The integration of the electronic identifier 16 begins with its placement inside the housing 44 of the cavity 35 followed by the insertion of a plug 39 in the face opening of the cavity 35. The preform of the body of the token is placed in a heating mould 41, 42.

The plug 39 is inserted in the cavity 35, preferably with a minimum clearance in a solid but deformable state during the later welding stage and offers a sufficient volume to completely fill the cavity 35 and form a good weld with the side 43 of the latter when the face opening 37 is closed.

The plug 39 (as well as the body) is made of a thermosetting material, loaded or not; for example a polymer chosen from among the non-saturated polyesters loaded between 50% and 70% in weight with barite or barium sulphate.

The integration of the electronic identifier ends with a thermocompression operation with the combined action of heat and pressure in the mould 41, 42, with a temperature of between 120 degrees C. and 160 degrees C. and an applied pressure of between 0.2 and 1 Mpa (between 2 and 10 bars).

As shown in FIG. 8, the plug 39 under the combined action of heat and pressure applied to each heated area looses its shape and welds with undulated mechanical interlocking 43 to the side wall of the cavity 35 and closes the face opening, the limit of the welding area disappearing (at least on the surface) in the event of identical or almost identical thermosetting materials for the plug 39 and the body or the token 32. Additionally, as in the previous embodiments, the plug may deform and flow into the perforations 28a" and completely through the envelope to fix the identifier and join the upper and lower faces of the token.

Of course, the description of this embodiment of the invention also applies to rectangular plaques and flat tokens or plaques with various contours, especially elliptic, as well as to plaques and tokens with through cavities closed by two plugs.

Figure 9:
FIG. 9 shows a perspective view of a gaming token including a surface decal or label with indicia.
Figure 10:
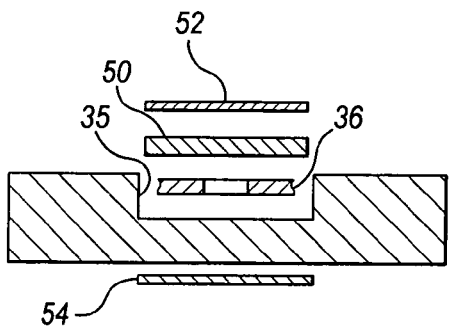
FIG. 10 is a diametric sectional view of the token of FIG. 9.

FIGS. 9 and 10 illustrate another embodiment of the invention that joins all of the components of a finished token, including decals or labels, in a single thermo-compression process. As in the previously described embodiment, the electronic pellet 36 is placed in a cavity 35 having a flat bottom surface. A plug, in the form a lid 50, overlies the pellet and in turn is covered by a decal 52. A similar decal 54 is placed beneath the token body.

The whole assembly is placed in a mold or between two compression plates, as in the previous embodiments, and compressed such that the individual components are joined or welded together with the planar surface of the decals 52 and 54 assuming a final position in the same plane as the upper and lower faces of the token body. In this way, but for any final trimming operations, a finished token is produced with the inlaid decals with the appropriate indicia.

Figure 11:
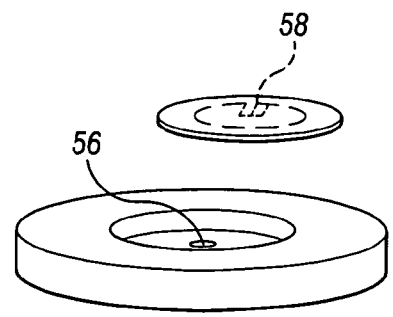
FIG. 11 is an exploded view of the FIG. 9 embodiment showing the orientation of the pellet so as to cooperate with a recess in the bottom of the cavity.

A refinement of the token body is shown in FIG. 11. Here, the bottom of the cavity includes a recess 56. The electronic pellet is placed in the cavity such that a component 58 of the electronic circuit, which has a greater depth or thickness than the other components, can be at least partially received in the recess. With this arrangement, potential damage to the particular component is mitigated during the compression process.

Thus, thanks to the invention described herein, it is possible to obtain gaming plaques and tokens with electronic identifiers, or similar devices approximately 3 mm thick, of good quality and at a low cost, while lessening the chance of damage to the electronic identifier or a lack of structural strength of the assembled token parts which would lead to rejects in the manufacturing process.

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description taken with the drawings making apparent to those skilled in the art how the several forms of the present invention may be embodied in practice.

It is noted that the foregoing examples have been provided merely for the purpose of explanation and are in no way to be construed as limiting of the present invention. While the present invention has been described with reference to an exemplary embodiment, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular means, materials and embodiments, the present invention is not intended to be limited to the particulars disclosed herein; rather, the present invention extends to all functionally equivalent structures, methods and uses, such as are within the scope of the appended claims.

What is claimed:

1. A method for manufacturing an electronic identifier pellet configured to be embedded in a gaming token having a top face and a bottom face parallel thereto and a cavity that opens to at least one of the two faces, the pellet including an electronic circuit, the method comprising:

forming a pair of planar plastic film layers;

perforating at least one of said film layers to define at least one hole configured to facilitate the flow of a deforming plug into and through the at least one hole, wherein the at least one hole is configured such that the deforming plug material flows within the cavity of the gaming token so as to fix the position of the envelope within the cavity of the gaming token, and wherein the flow of material into and through the at least one hole reduces the stresses from compressing the deforming plug on a surface of at least one of said pair of planar plastic film layers; and assembling the electronic circuit between said plastic film layers to provide an envelope enclosing said circuit.

2. The method of claim 1, wherein the electronic circuit includes an emitter-receiver and an antenna, and wherein the assembling further comprises:

locating the electronic circuit components about the periphery of said film layers, and perforating said at least one film layer in the interior area of said film layer, spaced from the components of said electronic circuit.

3. The method of claim 1, further comprising:

perforating each of said pair of film layers.

4. The method of claim 1, further comprising:

joining the peripheral edges of said pair of plastic film layers.

5. A method for manufacturing an electronic identifier pellet, the pellet including an electronic circuit, an emitter-receiver operatively connected to said circuit, and an antenna for receiving and sending identification signals, the method comprising:

forming a plastic sheet with spaced perforations;

cutting the plastic sheet to form discrete plastic films, each with at least one perforation;

assembling the electronic circuit, emitter-receiver and antenna between two plastic films; and joining the plastic films around their periphery to envelope the electronic identifier components and form the pellet, whereby an open passage through the perforations traverses the pellet and is configured to facilitate the flow of a deforming plug into and through the open passage, wherein the flow of material into and through the open passage reduces the stresses from compressing the deforming plug on a surface of at least one of the two plastic films enveloping the electronic identifier.

6. A method of making one of a gaming token or card comprising a flat body made of a plastic material, the flat body comprising at least two parallel faces and a cavity which opens to at least one of the at least two parallel faces, the cavity being adapted to receive an electronic identification device, at least one plug made of a plastic material, the at least one plug being adapted to be inserted into the cavity, wherein the electronic identification device is retained in the flat body when the at least one plug is inserted into the cavity, the method comprising:

making the flat body;

forming the cavity in the flat body;

placing the electronic identification device in the cavity, said electronic identification device including an electronic circuit enveloped between two plastic film layers, at least one of the layers including at least one hole;

inserting the at least one plug in the cavity;

fixing the at least one plug to the flat body by heating and compression; and forcing and causing the heated softened plastic material of the plug to pass through the hole in the at least one film layer of the electronic identification device, wherein the hole is configured such that the plastic material of the plug flows within the cavity of the gaming token or card so as to fix the position of the electronic identification device within the cavity of the gaming token or card, and wherein the flow of the plastic material of the plug into and through the hole reduces the stresses from compressing the plastic material of the plug on a surface of the at least one film layer of the electronic identification device having the at least one hole.

7. The method of claim 6, wherein the fixing comprises welding.

8. The method of claim 6, wherein the fixing comprises heating and applying pressure to one of the at least one plug and the flat body.

9. The method of claim 6, further comprising shaping the contour of the flat body by cutting.

10. The method of claim 6, further comprising removing sharp edges from the contour of the flat body by finishing.

11. The method of claim 6, wherein the fixing comprises thermo-compression molding.

12. The method of claim 6, wherein the fixing comprises:

heating the plastic components of the one of the gaming token or card; and deforming the components using a press.

13. A method for making a gaming token including a flat body having an upper and a lower face, an electronic identifier within the body and inlay or decal, with indicia, within and coplanar to the upper and lower faces, the method comprising:

making the flat body of plastic material;

forming a cavity with a bottom surface in the upper face of the body;

making a plastic lid for the cavity as a plug shaped to correspond to the shape of the cavity;

making decals to conform to the shape of the cavity;

assembling the element of the token by:

forming the electronic identifier having an electronic circuit enveloped by two plastic films, each plastic film having at least one hole within its periphery;

placing the electronic identifier within the cavity;

placing the lid over the electronic identifier within the cavity;

placing one of said decals over the lid and placing another of said decals on the lower face of the body; and applying heat and pressure to the assembly;

whereby the plastic materials are fixed or welded together and the plastic material of the plug extends through the holes of the electronic identifier to interconnect the upper face of the body with the bottom surface of the cavity and simultaneously embed the decals in a coplanar fashion with the upper and lower faces of the body, and whereby the at least one hole within the periphery of the two plastic films reduces the stresses from compressing the deforming plug on a surface of at least one of the two plastic films of the electronic identifier.

14. The method of claim 13, further comprising:

finishing the token by trimming and cutting operations.

15. The method of claim 13, wherein the electronic identifier includes a component of the circuit having a greater thickness than the other components, the method further comprising:

forming a recess in the bottom surface of the cavity; and placing the electronic identifier within the cavity such that its circuit component with greater thickness is at least partially received in and overlies said recess.

* * * * *